L. J. ANTOINE.
WINDSHIELD SPOTLIGHT SUPPORT.
APPLICATION FILED JAN. 24, 1921.

1,381,267.

Patented June 14, 1921.

Inventor
L. J. Antoine.
By Arthur H. Sturges.
Attorney

UNITED STATES PATENT OFFICE.

LUCIEN J. ANTOINE, OF COUNCIL BLUFFS, IOWA.

WINDSHIELD-SPOTLIGHT SUPPORT.

1,381,267.  Specification of Letters Patent.  Patented June 14, 1921.

Application filed January 24, 1921. Serial No. 439,580.

*To all whom it may concern:*

Be it known that I, LUCIEN J. ANTOINE, a citizen of the United States, residing at Council Bluffs, in the county of Pottawattamie and State of Iowa, have invented certain new and useful Improvements in Windshield-Spotlight Supports, of which the following is a specification.

The present invention relates to improvements in windshield spot-light supports, and aims to provide a device more particularly adapted for the construction of windshield used on the Ford automobile.

In accordance with the customary practice today spot-lights are clamped directly to the side frame of the windshield, and because of the light construction of the windshield and the heavy character of the spot-light, shocks and jars incident to travel of the vehicle have been the cause of fracturing the glass and otherwise causing injury both to the windshield and spot-light.

The present invention aims to remove these difficulties by providing an additional brace disassociated from the windshield frame and being connected to the corner clamps which reinforce the windshield frame, and which bracket provides for substantially the same vertical adjustment of the spot-light as is afforded when attached directly to the side piece of the windshield frame.

The improved brace will consequently take the jars and shocks off the glass and provides a simple and inexpensive construction applicable to the standard parts of Ford windshields so that the device is capable of being manufactured and sold as an attachment or adjunct.

With the foregoing and other objects in view, the invention will be more fully described hereinafter, and will be more particularly pointed out in the claims appended hereto.

Figure 1:
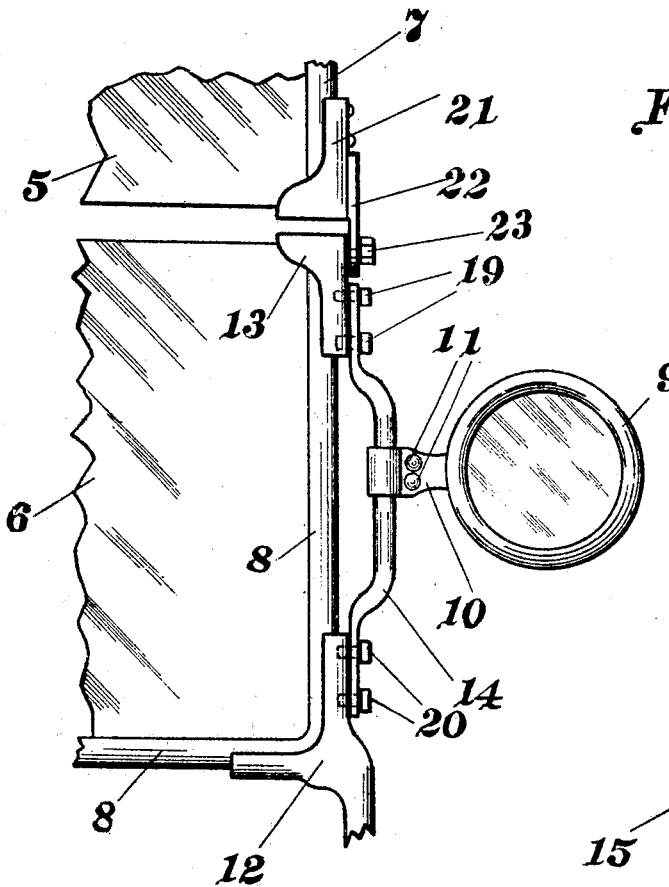
Figure 2:
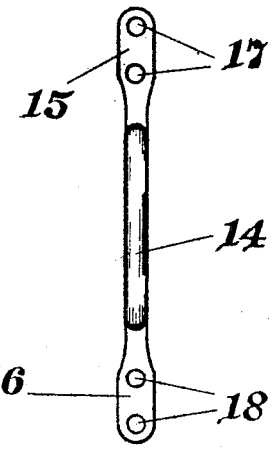

In the drawings, wherein like symbols refer to like or corresponding parts throughout the several views, Figure 1 is a fragmentary side elevational view of a windshield showing the improved bracket and spot-light connected thereto; and Fig. 2 is an edge view of the improved bracket.

Referring more particularly to the drawings, 5 and 6 designate the glasses of the upper and lower windshield sections respectively, and 7 and 8 indicate the usual metallic frame pieces that extend about three sides of the glasses, the adjacent edges of such glasses being left free as represented. The spot-light is represented at 9 and is of the usual or any suitable approved construction being provided with the usual clamp 10 having the bolts or other fastenings 11 by which the clamp is secured to and removed from the supporting part.

In accordance with former practices the clamp 10 was engaged directly with the side piece 8 of the lower windshield frame, and, due to the very light character of the metallic part 8, the shocks and jars of travel were directly transmitted to the glass 6 resulting in the fracture of the same, and in general other injuries to the metal frame and the spot-light.

In accordance with the present invention the glass 6 is removed from any strain or fracturing stresses, and the corner pieces 12 and 13 of the lower windshield section are made use of to support an intermediate bracket 14 which receives the clamp 10. This bracket 14 is composed of an intermediate elongated rounded portion which extends parallel to and spaced from the vertical side piece 8 of the lower windshield section, but which is wholly detached from the member 8. The intermediate rounded portion of the bracket 14 is offset from the ends 15 and 16 which are flattened and provided with perforations 17 and 18 in order to receive bolts 19 and 20 which are threaded into the corner pieces 12 and 13.

The flattened ends 15 and 16 of the bracket are of substantially elongated construction and being flattened are widened to a suitable extent so that they afford a substantially large area of contact with the corner pieces 12 and 13, and two bolts are preferably used to secure the ends of the bracket to the corner pieces so that an effective and rattle-proof construction may result. These bolts and the bracket ends also take up shocks and jars and remove them from the windshield parts so that the comparatively heavy spot-light 9 is effectively supported without injury to the windshield.

The bracket 14 affords all of the conveniences of adjustment and detachment that the windshield frame itself formerly yielded, and the bracket and bolts 19 and 20 form an economical construction which can be manufactured and sold at small cost to fit standard windshields without any alteration in the construction thereof.

The device may be attached in a few moments merely by providing threaded openings in the corner pieces 12 and 13. The upper windshield section is also provided with corner pieces, one such corner piece 21 being illustrated, and it is understood that the upper section of the windshield is susceptible of swinging down with respect to the lower section, a hinge piece 22 projecting downwardly from the upper corner piece 21 and being pivoted as by a bolt 23 to the upper corner piece 13 of the lower section. The improved attachment is such that it does not interfere with this hinge section.

The arched construction of the bracket 14 imparts to it a stiffness which is valuable in resisting the stresses set up by the weight in the spot-light 9.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. In combination with a windshield section composed of a glass, and a frame fitting about the edges of the glass, corner brackets secured to said windshield section, a bracket having an intermediate offset portion of substantially rounded and elongated construction lying approximately parallel with the vertical side member of the windshield frame section, said bracket provided with flattened ends secured against said corner braces, bolts engaging through said flattened ends and threaded in the corner braces, and a spot-light having a clamp adjustably secured on the intermediate portion of said bracket.

2. In combination with a windshield section composed of glass and a frame fitting about the edges of the glass, corner brackets secured to said windshield section, a bracket having an intermediate offset portion lying approximately parallel with the vertical side member of the windshield frame section, said bracket having its ends lying against said corner braces, means passing through the ends of said last mentioned bracket and into said corner brackets for securing said last mentioned bracket to the corner bracket, and a spot light having a clamp adjustably secured on the intermediate offset portion of said bracket.

In testimony whereof, I have affixed my signature in presence of two witnesses.

LUCIEN J. ANTOINE.

Witnesses:
ARTHUR H. STURGES,
HIRAM A. STURGES.